United States Patent [19]

Chang et al.

[11] Patent Number: 4,729,864

[45] Date of Patent: Mar. 8, 1988

[54] IN-MOLD LABELING OF PLASTIC CONTAINERS

[75] Inventors: Long F. Chang, Sylvania; Thomas C. Sanderson, Perrysburg, both of Ohio

[73] Assignee: Owens-Illinois Plastic Products Inc., Toledo, Ohio

[21] Appl. No.: 7,857

[22] Filed: Jan. 28, 1987

[51] Int. Cl.$^4$ .................. B29C 49/24; B29C 65/02; B29C 65/70
[52] U.S. Cl. .................................. 264/509; 264/40.1; 264/516; 264/525; 156/245; 156/DIG. 36; 156/DIG. 51
[58] Field of Search .............. 264/509, 516, 40.1, 264/265; 156/DIG. 50, DIG. 35, DIG. 36, DIG. 51, 245

[56] References Cited

U.S. PATENT DOCUMENTS

| | | | |
|---|---|---|---|
| 4,479,771 | 10/1984 | Slat et al. | 264/509 |
| 4,549,863 | 10/1985 | Bourgeas | 264/509 |
| 4,582,474 | 4/1986 | Ziegler | 425/583 |

*Primary Examiner*—Jan H. Silbaugh
*Assistant Examiner*—Neil Michael McCarthy

[57] ABSTRACT

In an in-molding process of forming plastic containers wherein a label is located inside the blow mold and then a parison is blown outwardly in the mold so that the heat from the parison and the pressure generated by the blow medium activates adhesive on the label to bind the label on the blown container side wall, the method of eliminating undesirable label panel deformation which comprises controlling the moisture of the label such that the shrinkage of the label matches the shrinkage of the plastic side wall against which the label is placed.

3 Claims, No Drawings

IN-MOLD LABELING OF PLASTIC CONTAINERS

This invention relates to in-mold labeling.

BACKGROUND AND SUMMARY OF THE INVENTION

It has been recognized that containers fabricated using in-mold labeling processes have higher quality in the labeling surface and in the appearance. Typical in-mold labeling (IML) processes involve (1) locating label inside the blow mold and then (2) blowing the parison in the mold against the confines of the mold. The heat from the parison and the pressure generated by the blow medium activates adhesive on the back of the label to bind the label on the blown container side wall.

Some of the problems normally encountered in the application of the IML methods are:

1. Deformation or bulging of the container side wall caused by the difference of shrinkage between the side wall and the label.
2. Prolonging blow molding cycle time due to the decrease of the overall thermal conductance between the plastic wall and the mold (separated by the label which generally has a lower thermal conductivity).
3. Blistering of the labeled side wall.
4. Increase in the overflow volume.
5. A lower fill point due to the increase in the overflow volume possibly giving the impression to a consumer that the container does not contain the required fluid contents.

It has been discovered that the side wall deformation is mainly caused by the fact that the paper label used in the process shrinks less than the plastic side wall during the cooling process. Another reason for the deformation is the fact that the paper label has a larger modulus of elasticity or is stiffer than the plastic.

In accordance with the invention, an in-molding process of forming plastic containers wherein undesirable label panel deformation is eliminated which comprises controlling the moisture of the label such that the shrinkage of the label matches the shrinkage of the plastic side wall against which the label is placed.

DESCRIPTION

It has been recognized that containers fabricated using in-mold labeling processes have higher quality in the labeling surface and in the appearance. Typical in-mold labeling (IML) processes involve (1) locating label inside the blow mold and then (2) blowing parison into the mold. The heat from the parison and the pressure generated by the blow medium activates the adhesive on the back of the label to bind the label on the blown container side wall.

Some of the problems normally encountered in the application of the in-mold labeling methods are:

1. Deformation of the container side wall caused by the difference of shrinkage between the side wall and the label.
2. Prolonging blow molding cycle time due to the decrease of the overall thermal conductance between the plastic wall and the mold (separated by the label which generally has a lower thermal conductivity).
3. Blistering of the labeled side wall due to trapped air.

We have discovered that the side wall deformation is mainly caused by the fact that the paper label used in the process shrinks less than the plastic side wall through the cooling process. Another reason of this deformation is due to the fact that the paper label has a larger modulus of elasticity or is stiffer than the plastic.

The container side wall deformation can be eliminated or reduced in two ways: (1) to match the label shrinkage with the plastic side wall shrinkage, or (2) to use a soft label so that the label can easily shrink with the side wall (or more precisely forced to shrink by the side wall shrinkage). One method of achieving the objective or reducing or eliminating the deformation is to use soft plastic as the label. This will also reduce the difference in shrinkage and hence deformation of the blown bottles.

When paper is used for the label in the process, the low shrinkage and the high stiffness of the paper tend to make the side wall deformation a serious problem. In accordance with this invention the side wall deformation can be alleviated or eliminated by controlling stiffness and the shrinkage of the paper label through the adjustment of the moisture content in the paper label.

It has been found that by increase in the relative humidity or the moisture content of the paper label, it is possible to eliminate substantially the deformation in the in-mold labeling.

Another advantage of increasing the moisture level in the paper label is to increase the heat absorption (heat of evaporation) and the effective heat conductance between the plastic and the mold, resulting in reduction of required cooling time of the side wall.

As indicated in the following table, tests utilizing normal paper labels and moisture conditioned labels show that overflow capacity is less, fill point level is reduced and waist dimensions are reduced, the latter being where the bottle has a narrow waist.

| | NORMAL | CONDITIONED | |
|---|---|---|---|
| Bottle A | | | |
| Overflow oz. | 31.86 | 31.58 | |
| Fill Point in. | 2.592 | 2.429 | |
| Bottle B | | | |
| Overflow oz. | 34.38 | 33.66 | |
| Fill Point | 1.659 | 1.437 | |
| Waist Dimension | 1.982 | 1.893 | |
| Bottle C | | | |
| Overflow #1 | 41.67 oz. | 40.31 oz. | |
| Overflow #2 | 41.22 oz. | 40.28 oz. | |
| Overflow #3 | 41.0 oz. | 40.08 oz. | |
| Bottle D | | | |
| Percent Moisture | 3.68% | 4.19% | 7.1% |
| Overflow oz. | 23.13 | 22.96 | 23.13 |
| Label Panel Waist Dimension in. | 2.120 | 2.076 | 1.916 |

It has further been discovered that optimum results are achieved where the moisture level of the paper labels are about 6–8%.

We claim:

1. In an in-molding method of forming a plastic container wherein a paper label is placed inside the blow mold and then a parison is blown outwardly into the mold so that heat from the parison and pressure generated by the blow medium binds the label on the blown container side wall, the step of controlling moisture content of the label prior to placement in the mold such that the moisture content of the label is such that during cooling of the plastic container, the shrinkage of the label matches the shrinkage of the plastic side wall against which the label is placed, and side wall deformation is substantially eliminated.

2. The method set forth in claim 1 wherein the moisture content of the label is controlled such that moisture content ranges between about 6–8%.

3. In an in-molding method of forming a plastic container wherein a paper label is placed inside the blow mold and then a parison is blown outwardly into the mold so that heat from the parison and pressure generated by the blow medium binds the label on the blown container side wall, the step of controlling the moisture content of the paper label prior to placement in the mold such that the moisture content of the paper label ranges between 6–8% and side wall deformation of the plastic contamer is substantially eliminated.

* * * * *